(12) United States Patent
Imagawa et al.

(10) Patent No.: US 10,995,790 B2
(45) Date of Patent: May 4, 2021

(54) ELONGATE MEMBER ASSEMBLY

(71) Applicant: HI-LEX CORPORATION, Takarazuka (JP)

(72) Inventors: Takuma Imagawa, Takarazuka (JP); Hiroshi Masuda, Takarazuka (JP)

(73) Assignee: HI-LEX CORPORATION, Takarazuka (JP)

(*) Notice: Subject to any disclaimer, the term of this patent is extended or adjusted under 35 U.S.C. 154(b) by 0 days.

(21) Appl. No.: 16/650,315

(22) PCT Filed: Oct. 10, 2018

(86) PCT No.: PCT/JP2018/037730
§ 371 (c)(1),
(2) Date: Mar. 24, 2020

(87) PCT Pub. No.: WO2019/074003
PCT Pub. Date: Apr. 18, 2019

(65) Prior Publication Data
US 2020/0217353 A1 Jul. 9, 2020

(30) Foreign Application Priority Data
Oct. 11, 2017 (JP) .............................. JP2017-197908

(51) Int. Cl.
*F16C 1/10* (2006.01)
*F16C 1/26* (2006.01)

(52) U.S. Cl.
CPC ................ *F16C 1/10* (2013.01); *F16C 1/103* (2013.01); *F16C 1/26* (2013.01)

(58) Field of Classification Search
CPC ...... F16C 1/10; F16C 1/22; F16C 1/26; F16C 1/103; B21C 37/20
See application file for complete search history.

(56) References Cited

U.S. PATENT DOCUMENTS 3,139,254 A * 6/1964 Voorhees .............. B63H 21/265
248/74.1
3,776,092 A * 12/1973 Seckerson ............. F16B 21/088
411/509

(Continued)

FOREIGN PATENT DOCUMENTS

JP S53-154398 U 12/1978
JP S64-57413 U 4/1989

(Continued)

OTHER PUBLICATIONS

Machine translation of JP 2009-108953 A obtained on Jul. 1, 2020.*

(Continued)

*Primary Examiner* — Adam D Rogers
(74) *Attorney, Agent, or Firm* — Kratz, Quintos & Hanson, LLP

(57) ABSTRACT

An elongate member assembly having an elongate member, a connecting member provided between one end and another end of the elongate member, and a swaging member that swages and fixes the connecting member to the elongate member, and fixing member connected to the connecting member. The connecting member includes a swaging portion pressed by the swaging member on the elongate member, and a connecting portion connected to the fixing member. The fixing member includes an anchor portion mounted to a mounting object member, and a ring-shaped portion connected to the connecting portion. The connecting portion includes, a rotation permitting portion that permits the ring-shaped portion to move, and a movement limiting portion that limits movement of the ring-shaped portion. The elongate member assembly facilitates the fixing thereof onto the mounting object member.

3 Claims, 3 Drawing Sheets

(56) References Cited

U.S. PATENT DOCUMENTS

| | | | | |
|---|---|---|---|---|
| 4,011,770 A * | 3/1977 | Webb | ............... | F16C 1/10 |
| | | | | 74/502.4 |
| 5,230,257 A * | 7/1993 | Nowak | ............... | F16C 1/14 |
| | | | | 248/71 |
| 5,544,543 A * | 8/1996 | Hilgert | ............... | F16C 1/226 |
| | | | | 74/501.5 R |
| 9,488,296 B1 * | 11/2016 | Lucas | ............... | F16L 3/08 |
| 2012/0174349 A1 * | 7/2012 | Fannon | ............... | E05B 79/20 |
| | | | | 24/457 |

FOREIGN PATENT DOCUMENTS

| | | | |
|---|---|---|---|
| JP | H02-40117 U | 3/1990 | |
| JP | 2009-108953 A | 5/2009 | |
| JP | 2013-241983 A | 12/2013 | |

OTHER PUBLICATIONS

International Search Report for International Application No. PCT/JP2018/037730 dated Dec. 25, 2018 (3 sheets, 2 sheets translation, 5 sheets total).

Written Opinion of the International Searching Authority for International Application No. PCT/JP2018/037730 dated Dec. 25, 2018 (4 sheets).

\* cited by examiner

ELONGATE MEMBER ASSEMBLY

TECHNICAL FIELD

The present invention relates to an elongate member assembly.

BACKGROUND ART

When an elongate member such as a control cable is used for remote control, one end is connected to an operating object, and the other end is connected to an operation member and mounted to a mounting object. At this time, the elongate member is disposed at a predetermined position and fixed to the mounting object so as not to change the disposed position. To fix the elongate member to the mounting object, an elongate member assembly (e.g., Patent Literature 1) including, for example, an elongate member and a bracket which is a fixing member fixed by swaging on the outer circumference of the elongate member and fixing to the mounting object such as a vehicle.

CITATION LIST

Patent Literature

Patent Literature 1: JP 2013-241983 A

SUMMARY OF INVENTION

Technical Problem

In such an elongate member assembly, however, the bracket is fixed to the elongate member by swaging at a predetermined position, so that a direction in which the base of the bracket extends is limited to a direction radially outward from the elongate member. Thus, mounting the elongate member assembly to the mounting object is difficult, because the bracket does not align with the mounting position of the mounting object. Therefore, it is desired to provide a fixing member having a structure capable of easily fixing the elongate member assembly to the mounting object.

An object of the present invention is to provide an elongate member assembly capable of fixing easily to a mounting object member.

Solution to Problem

An elongate member assembly of the present invention includes an elongate member having one end and the other end, a connecting member provided between the one end and the other end of the elongate member, a swaging member that swages and fixes the connecting member to the elongate member, and a fixing member connected to the connecting member. The connecting member includes a swaging portion pressed by the swaging member on the elongate member, and a connecting portion connected to the fixing member. The fixing member includes an anchor portion mounted to a mounting object member, and a ring-shaped portion connected to the connecting portion of the connecting member. The connecting portion includes a hole through which the elongate member penetrates, a rotation permitting portion that permits the ring-shaped portion to move around the axis of the elongate member, and a movement limiting portion that limits movement of the ring-shaped portion in the axial direction of the elongate member.

Advantageous Effects of Invention

The elongate member assembly of the present invention facilitates fixing to the mounting object member.

DESCRIPTION OF EMBODIMENTS

Hereinafter, an elongate member assembly according to an embodiment of the present invention will be described with reference to the drawings. Note that the following embodiment is merely an example, and the elongate member assembly of the present invention is not limited to the following embodiment.

Figure 1:
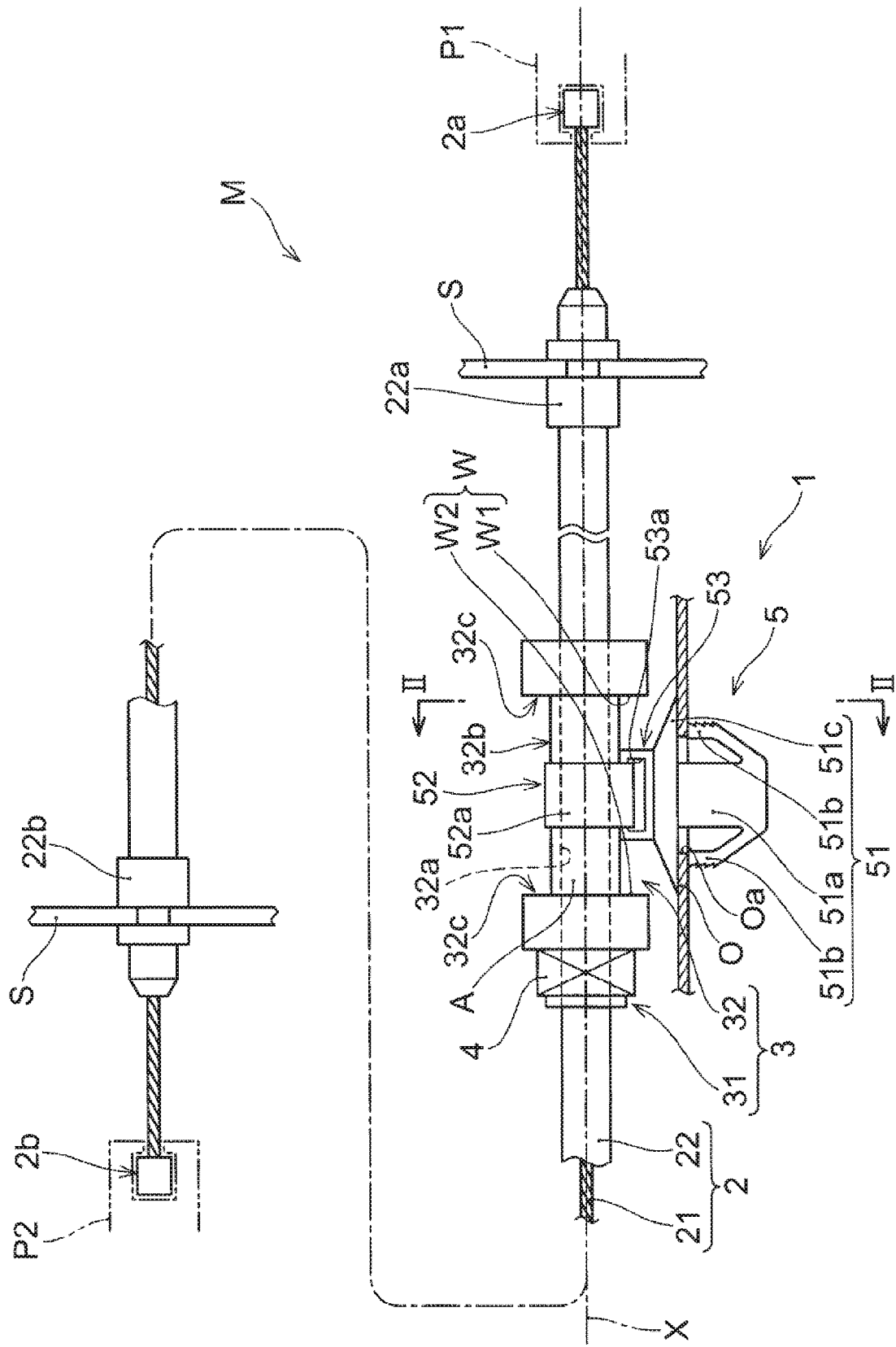
FIG. 1 is an overall view illustrating an elongate member assembly according to an embodiment of the present invention.

As illustrated in FIG. 1, an elongate member assembly of the present embodiment includes an elongate member 2 having one end 2a and the other end 2b, a connecting member 3 provided between the one end 2a and the other end 2b of the elongate member 2, a swaging member 4 that swages and fixes the connecting member 3 to the elongate member 2, and a fixing member 5 that connects to the connecting member 3.

The elongate member assembly 1 is an assembly in which the connecting member 3, the swaging member 4, the fixing member 5, and the like are mounted to the elongate member 2. Note that the elongate member assembly 1 may include a member other than the connecting member 3, the swaging member 4, and the fixing member 5. The elongate member assembly 1 is mounted to an object to be assembled such as a vehicle along a predetermined routing path. Note that the object to which the elongate member assembly 1 is assembled is not limited to the vehicle, and the elongate member assembly 1 is applicable to optional structure that transmits an operating force with the elongate member 2.

In the present embodiment, as illustrated in FIG. 1, the elongate member assembly 1 is applied to an operating force transmitting mechanism M that transmits the operating force applied to the one end 2a of the elongate member 2 to the other end 2b of the elongate member 2 through the elongate member 2 and remotely controls a member provided on the other end 2b of the elongate member 2. In the present embodiment, as illustrated in FIG. 1, the operating force transmitting mechanism M includes the elongate member assembly 1, an operation member P1 connected to the one end 2a of the elongate member 2 and subjected to a predetermined operation, and an operating object P2 connected to the other end 2b of the elongate member 2 and operated by the operating force of the operation member P1. For example, when the operation member P1 is operated at the one end 2a of the elongate member 2, the operating force of the operation member P1 is transmitted to the other end 2b of the elongate member 2 through the elongate member 2 to remotely control the operating object P2. The operating force transmitting mechanism M may be, for example, an opening/closing mechanism for a fuel filler of a vehicle or an opening/closing mechanism for a hood of a vehicle.

Figure 3:
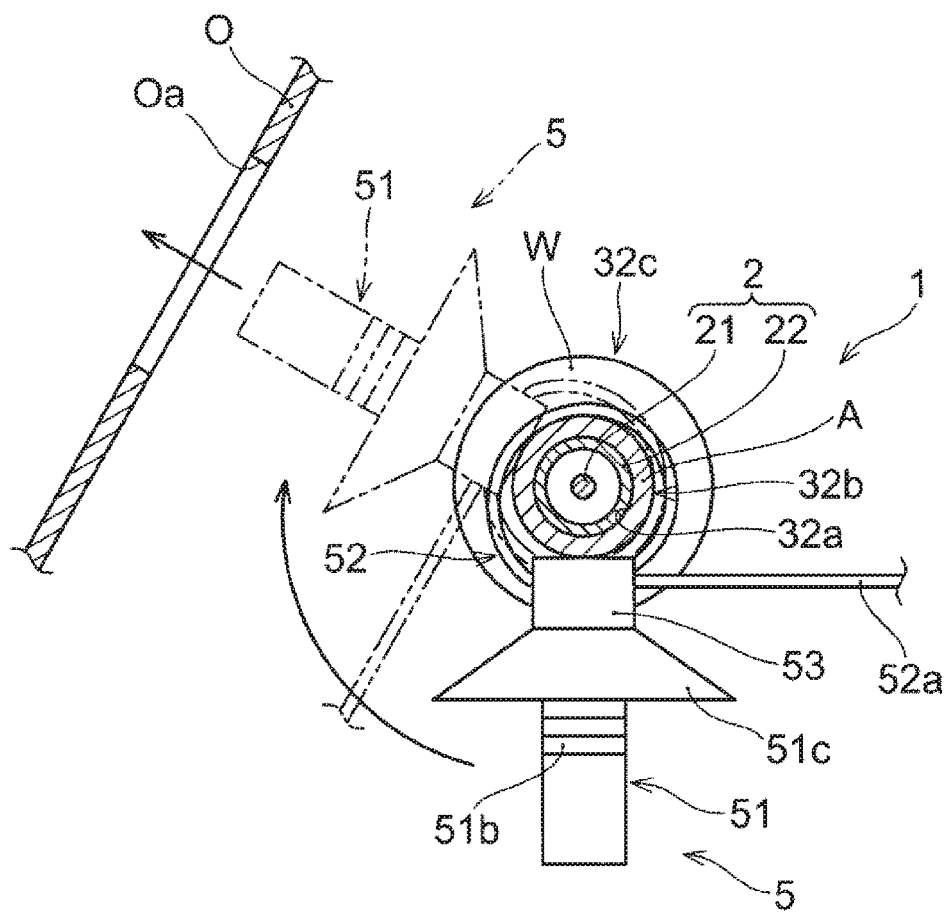
FIG. 3 is a view illustrating a state in which a ring-shaped portion of the elongate member assembly illustrated in FIG. 1 has rotated with respect to a rotation permitting portion.
Figure 4:
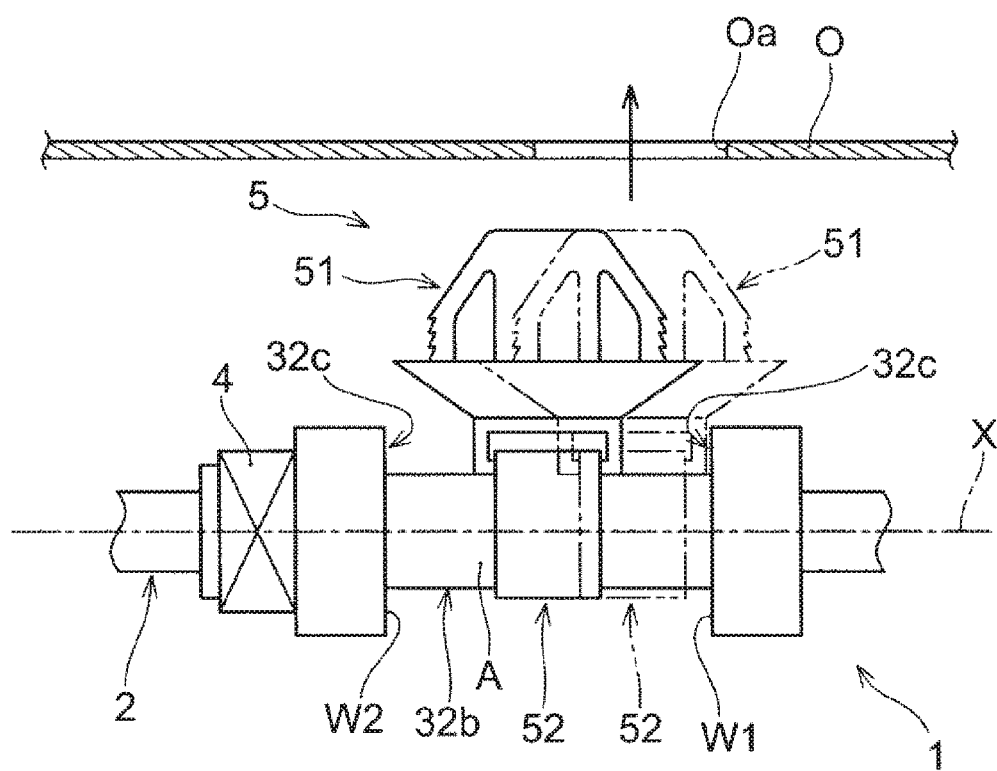
FIG. 4 is a view illustrating a state in which the ring-shaped portion of the elongate member assembly illustrated in FIG. 1 has moved in an axial direction with respect to the rotation permitting portion.

The elongate member assembly 1 is mounted to a mounting object member O such as a vehicle body at least at one location between the one end 2a and the other end 2b of the elongate member 2, and the elongate member 2 is routed along a predetermined path. Note that the elongate member assembly 1 may be mounted to the mounting object member O at more than one location between the one end 2a and the member O supports the elongate member assembly 1 at a desired position via the fixing member 5 of the elongate member assembly 1. The shape and structure of the mounting object member O are not particularly limited as long as the fixing member 5 can be mounted to support the elongate member 2 with the mounting object member O. The mounting object member O can be, for example, a plate-like member, a frame, a housing, or the like, such as a bracket, a vehicle component, or a vehicle body, to which the fixing member 5 can be mounted, in the present embodiment, the mounting object member O has a mounting portion such as a mounting hole Ca, as illustrated in FIGS. 1, 3, and 4, so that the fixing member 5 is mounted via the mounting portion of the mounting object member O. The mounting portion is not limited to the mounting hole Oa, and may be a slit, a groove, or the like, to which the fixing member 5 can be mounted.

As illustrated in FIG. 1, the elongate member 2 of the elongate member assembly 1 is a long and thin elongate body, and has one end 2a and the other end 2b. The elongate member 2 is routed along a desired routing path from the one end 2a to the other end 2b. In the present embodiment, the elongate member 2 is flexible and can be routed along a curved routing path between the one end 2a and the other end 2b fixed at predetermined positions. In the present embodiment, the elongate member 2 is a control cable that transmits an operating force between the one end 2a and the other end 2b and includes an inner cable 21 and an outer casing 22 through which the inner cable 21 is inserted, as illustrated in FIG. 1.

The inner cable 21 is slidably inserted into a hollow portion of the outer casing 22.

The inner cable 21 is flexible, and can transmit the operating force applied to the one end 2a to the other end 2b in a curved routing path. In the present embodiment, the one end 2a which is a cable end on one side of the inner cable 21 is connected to the operation member P1, while the other end 2b which is a cable end on the other side of the inner cable 21 is connected to the object to be operated P2. The operating force applied to the operation member P1 is transmitted to the object to be operated P2 via the inner cable 21, and thus the operating object P2 is operated.

The outer casing 22 slidably accommodates the inner cable 21 and is routed along a desired routing path. The outer casing 22 is flexible and is able to guide the inner cable 21 along a curved routing path. In the present embodiment, the outer casing 22 is mounted to the mounting object member O via the connecting member 3 and the fixing member 5 at a desired position between one end and the other end of the outer casing 22. Terminal connecting members 22a and 22b are provided at one end and the other end of the outer casing 22, respectively. As illustrated in FIG. 1, each terminal connecting member 22a, 22b is mounted to a support body S such as a bracket having a cutout portion to which the terminal connecting member 22a, 22b can be mounted.

The connecting member 3 is a mounting object member to the elongate member 2 and to which the fixing member 5 is connected. The connecting member 3 is mounted to the outer circumference of the elongate member 2 at a predetermined position between the one end 2a and the other end 2b of the elongate member 2. A material of the connecting member 3 is not particularly limited, but the connecting member may be formed of, for example, rubber, synthetic resin, or the like. As illustrated in FIG. 1, the connecting member 3 has a swaging portion 31 pressed on the elongate member 2 by the swaging member 4, and a connecting portion 32 connected to the fixing member 5.

The swaging portion 31 is pressed toward the outer circumference of the elongate member 2 when the swaging member 4 is swaged, and the pressing force applied to the elongate member 2 from the swaging portion 31 allows the connecting member 3 to be mounted to the elongate member 2. In the present embodiment, the connecting member 3 is fixed so as not to move in directions around the axis X of the elongate member 2 and in the axis X direction by the pressing force of the swaging portion 31.

The swaging portion 31 has a predetermined length in the axis X direction of the elongate member 2 to allow swaging the swaging member 4, and intervenes between the elongate member 2 and the swaging member 4 when the swaging member 4 is swaged. In the present embodiment, the swaging portion 31 is formed in a substantially cylindrical shape. The shape of the swaging portion 31 is not particularly limited as long as the swaging member 4 can be swaged and the connecting member 3 can be mounted to the elongate member 2. The swaging portion 31 does not need to cover the entire circumference of the elongate member 2 and may have, for example, a slit extending along the axial direction of the elongate member 2.

In the present embodiment, the swaging portion 31 is provided adjacent to the connecting portion 32 in the axis X direction of the elongate member 2. Another part may intervene between the swaging portion 31 and the connecting portion 32 in the axis X direction. In the present embodiment, the swaging portion 31 is provided on one end side of the connecting member 3 in the axis X direction. The swaging portions 31 may also be provided on both end sides of the connecting member 3, and the position and the number of the swaging portions 31 in the connecting member 3 are not particularly limited.

The swaging member 4 presses the swaging portion 31 toward the elongate member 2 by swaging with a predetermined jig or the like. The shape and structure of the swaging member 4 are not particularly limited as long as the swaging portion 31 can be pressed toward the elongate member 2. For example, the swaging member 4 may be formed in an annular shape so as to cover the entire outer circumference of the elongate member 2 around the axis X, or to partially cover the outer circumference of the elongate member 2 around the axis X, so that a cross-section vertical to the axis X direction is in C-shape. Note that the swaging member 4 may be formed, for example, by fastening two semi-cylindrical members mounted to the outer circumference of the swaging portion 31 with a fastening member such as a screw, and pressing the swaging portion 31 toward the outer circumference of the elongate member 2.

The connecting portion 32 is a part to which the fixing member 5 is connected. By connecting the fixing member 5 to the connecting portion 32, the elongate member 2 and the fixing member 5 are connected via the connecting member 3 to allow the elongate member assembly 1 to be mounted to the mounting object member O. The connecting portion 32 will be described later.

The fixing member 5 is mounted to the mounting object member O and fixes the elongate member assembly 1 including the elongate member 2 and the connecting member 3 to the mounting object member O. The fixing member 5 is connected to the connecting portion 32 of the connecting member 3 connected to the elongate member 2. As illustrated in FIG. 1, the fixing member 5 includes an anchor portion 51 mounted to the mounting object member O and a ring-shaped portion 52 connected to the connecting portion 32 of the connecting member 3.

Figure 2:
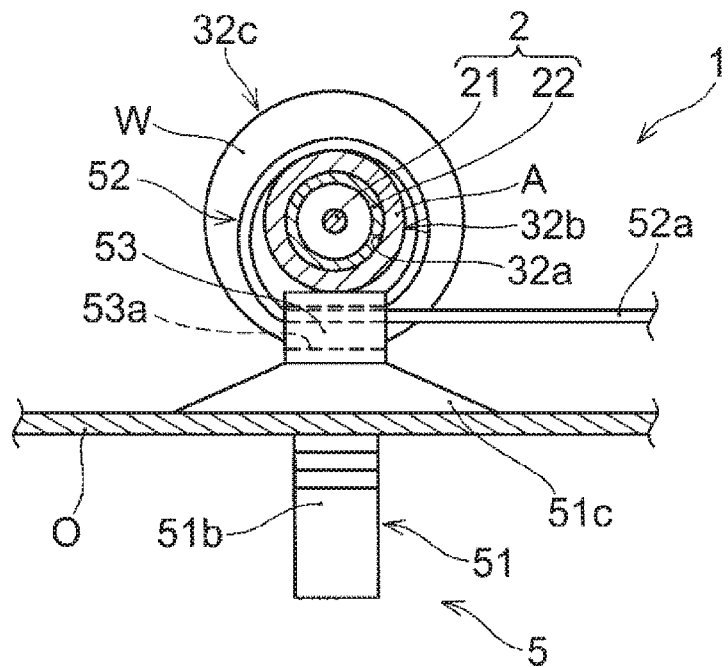
FIG. 2 is a cross-sectional view taken along line II-II of FIG. 1.

The anchor portion 51 is a part that is mounted to the mounting object member O. The shape and structure of the anchor portion 51 are not particularly limited as long as the elongate member assembly 1 can be mounted to the mounting object member O. In the present embodiment, the anchor portion 51 is inserted through the mounting hole Oa formed in the mounting object member O and mounted. As illustrated in FIGS. 1 and 2, the anchor portion 51 includes an extending portion 51a that extends from a base 53 (a band accommodating portion 53a which will be described later) of the fixing member 5 radially outward of the elongate member 2, and a pair of locking portions 51b with a distance between the locking portions 51b increasing from the leading end side of the extending portion 51a toward the base end side of the extending portion 51a. Further, in the present embodiment, the anchor portion 51 is formed in the shape of a disc spring and has an abutting portion 51c that abuts on one surface of the mounting object member O around the mounting hole Oa.

The ring-shaped portion 52 is connected to the connecting portion 32 of the connecting member 3, and the fixing member 5 is mounted to the connecting member 3. The ring-shaped portion 52 is rotatably mounted to the connecting portion 32, which will be described later. In the present embodiment, the ring-shaped portion 52 has an elongate belt-like band portion 52a extending from the base 53. As illustrated in FIG. 2, the ring-shaped portion 52 has an annular shape in which the band portion 52a is wound around the connecting portion 32, and the band portion 52a is inserted into a band accommodating portion 53a formed penetrating through the base 53. The band portion 52a has a plurality of engaging portions (not illustrated) in a length direction of the band portion 52a. The engaging portions of the band portion 52a engage with engaged portions (not illustrated) formed in the band accommodating portion 53a to maintain the band portion 52a in the annular state. The ring-shaped portion 52 may cover the entire circumference around the axis X of the connecting portion 32, as illustrated in FIG. 2, or may partially cover the circumference, like a O-ring, around the axis X of the connecting portion 32. The present embodiment only illustrates one ring-shaped portion 52, but the number of ring-shaped portions is not particularly limited, and may have a plurality of ring-shaped portions.

In the present embodiment, after the ring-shaped portion 52 in which the band portion 52a is wound around the connecting portion 32 is connected to the connecting portion 32, the extending portion 51a and the locking portions 51b of the anchor portion 51 are inserted into the mounting hole Oa of the mounting object member O, and the elongate member assembly 1 is mounted to the mounting object member O. Specifically, as the extending portion 51a and the locking portions 51b of the anchor portion 51 are inserted into the mounting hole Oa, the pair of locking portions 51b elastically deforms inward so as to decrease the distance between the locking portions 51b. Then, the pair of locking portions 51b expands outward by a restoring force when the leading ends of the locking portions 51b pass through the mounting hole Oa. As illustrated in FIG. 1, the leading ends of the expanded locking portions 51b engage one surface of the mounting object member O at the periphery of the mounting hole Oa, while the disc spring-shaped contact portion 51c comes into contact with the other surface of the mounting object member O. As a result, the anchor portion 51 sandwiches the plate-shaped mounting object member O from both sides, the fixing member 5 is fixed to the mounting object member O, and the elongate member assembly 1 is mounted to the mounting object member O.

As illustrated in FIG. 1, the connecting portion 32 includes a hole 32a through which the elongate member 2 penetrates, a rotation permitting portion 32b that permits the ring-shaped portion 52 to move around the axis of the elongate member 2, and a movement limiting portion 32c that limits the movement of the ring-shaped portion 52 in the axial direction of the elongate member 2.

The elongate member 2 is inserted into the hole 32a. The hole 32a is formed to penetrate through the connecting portion 32. In the present embodiment, the hole 32a penetrates through the swaging portion 31 and the connecting portion 32 of the connecting member 3 to allow the elongate member 2 to be inserted through the connecting member 3.

The rotation permitting portion 32b is a part to which the ring-shaped portion 52 of the fixing member 5 is movably mounted around the axis X of the elongate member 2. The rotation permitting portion 32b is mounted in a non-fixing state, without the ring-shaped portion 52 being swaged on or adhered to the outer circumference of the rotation permitting portion 32b, to allow the ring-shaped portion 52 to move around the axis X of the elongate member 2. In the present embodiment, the ring-shaped portion 52 is mounted so as to partially provide a gap between the ring-shaped portion 52 and the outer periphery of the rotation permitting portion 32b, thus smoothing the movement of the ring-shaped portion 52 around the axis X with respect to the rotation permitting portion 32b. Note that, the ring-shaped portion 52 may be in contact with the entire outer circumference of the rotation permitting portion 32b as long as the ring-shaped portion 52 is configured so as to be movable around the axis X of the elongate member 2 with respect to the rotation permitting portion 32b. Further, the shape of the rotation permitting portion 32b is not particularly limited as long as the ring-shaped portion 52 is configured to be movable around the axis X of the elongate member 2. Further, in the present embodiment, the rotation permitting portion 32b is configured such that its cross-section is perpendicular to the direction of the axis X of the elongate member 2 and is substantially circular, but may be formed in other shapes including a polygonal shape.

As illustrated in FIG. 1, in the present embodiment, the rotation permitting portion 32b has an annular portion A having a smooth surface around the axis X of the elongate member 2. The annular portion A having a smooth surface facilitates rotation of the ring-shaped portion 52 around the axis X of the elongate member 2. In the present embodiment, the annular portion A is formed in a substantially cylindrical shape whose cross-section being vertical in the direction of the axis X is substantially circular, but the smooth surface that facilitates rotation of the ring-shaped portion 52 needs to be formed at least partially around the axis. The annular portion A is not limited to a substantially cylindrical shape, and may have a curved surface partially on the outer circumference of the annular portion A having, for example, an elliptical cross-section perpendicular to the axis X direction. Since the rotation permitting portion 32b permits the rotation of the outer casing 22 of the ring-shaped portion 52 around the axis, the anchor portion 51 can adjust the position of the outer casing 22 around the axis with respect to the mounting portion provided on the outer casing 22 for the mounting object member O, while positioning a predetermined part of the outer casing 22 at a predetermined position of the mounting object member O. The mounting portion provided on the outer casing 22 for the mounting object member O may be, for example, a locking portion of a cap provided at an end of the outer casing 22.

The movement limiting portion 32c limits the movement of the ring-shaped portion 52 in the axis X direction of the elongate member 2, and holds the ring-shaped portion 52 at a predetermined position in the axis X direction with respect to the connecting member 3. The movement limiting portion 32c is configured to come into contact with the ring-shaped portion 52 in the axis X direction when the ring-shaped portion 52 of the fixing member 5 starts to move in the axis X direction of the elongate member 2. In the present embodiment, the movement of the ring-shaped portion 52 is limited in both directions (left-right direction in FIG. 1) in the direction of the axis X, and the ring-shaped portion 52 is held at a predetermined position with respect to the connecting member 3. Note that the movement limiting portion 32c may limit the movement of the ring-shaped portion 52 so that the ring-shaped portion 52 moves within a predetermined range in the axis X direction as described later or substantially stops in the axis X direction.

In the present embodiment, the movement limiting portion 32c is provided on both sides of the rotation permitting portion 32b in the axis X direction, and limits the movement on both sides of the ring-shaped portion 52 in the axis X direction. Note that, in the present embodiment, a pair of movement limiting portions 32c separated in the direction of the axis X is provided, but the number of movement limiting portions is not particularly limited. For example, in a case where the fixing member 5 includes a pair of ring-shaped portions 52 separated from each other in the axis X direction, one movement limiting portion may be provided between the pair of ring-shaped portions in the axis X direction to limit the movement on both sides of the ring-shaped portions in the axis X direction. Further, the movement limiting portion 32c is provided entirely over the connecting portion 32 around the axis X in the present embodiment, but the movement limiting portion 32c may be provided partially around the axis X.

In the present embodiment, the movement limiting portion 32c includes a wall-shaped portion W extending radially outward beyond the annular portion A. The wall-shaped portion W extends radially outward beyond the annular portion A at a height capable of contacting on the ring-shaped portion 52. The wall-shaped portion W comes into contact with the end of the ring-shaped portion 52 in the direction of the axis X to limit the movement of the ring-shaped portion 52. In the present embodiment, the movement limiting portion 32c includes a wall-shaped portion W1 on one side of the elongate member 2 and a wall-shaped portion W2 on the other side of the elongate member 2. The wall-shaped portion W1 on one side and the wall-shaped portion W2 on the other side are provided on both sides of the rotation permitting portion 32b in the axis X direction. In the present embodiment, the wall-shaped portion W1 on one side and the wall-shaped portion W2 on the other side are each formed by one end surface of a substantially cylindrical large-diameter portion having an outer diameter larger than the outer diameter of the substantially cylindrical rotation permitting portion 32b.

The movement limiting portion 32c may be a projection that comes into contact with the ring-shaped portion 52 when the ring-shaped portion 52 starts to move in the axis X direction, or a tapered surface having an outer diameter gradually increasing as the ring-shaped portion 52 moves away from the rotation permitting portion 32c in the axis X direction. In addition, the movement limiting portion 32c may be formed of a material less slippery when the ring-shaped portion 52 starts to move in the axis X direction, or may be subjected to surface treatment to restrict the movement of the ring-shaped portion 52 in the axis X direction.

In the present embodiment, the ring-shaped portion 52 is movable by the rotation permitting portion 32b around the axis X with respect to the rotation permitting portion 32b, and the movement of the ring-shaped portion 52 is limited in the axis X direction by the movement limiting portion 32c. Therefore, the fixing member 5 provided with the ring-shaped portion 52 is able to change the direction in which the anchor portion 51 extends with respect to the connecting portion 32 in a state where the fixing member 5 is held at u predetermined position near the mounting portion (the mounting hole Oa) of the mounting object member O in the axis X direction. For example, as illustrated in FIG. 3, even when the mounting direction of the mounting object member C is deviated from the direction in which the anchor portion 51 extends from the connecting portion 32 around the axis X, the ring-shaped portion 52 can be rotated with respect to the rotation permitting portion 32b to change the direction in which the anchor portion 51 extends. Therefore, the present embodiment facilitates fixing the elongate member assembly 1 to the mounting object member O (e.g., the mounting hole Oa). In addition, unlike the case where the ring-shaped portion 52 does not rotate with respect to the connecting portion 32 (e.g., the case where the ring-shaped portion 52 is swaged or bonded to the connecting portion 32), the outer casing 22 is not twisted during changing of the extending direction of the anchor portion 51 in the present embodiment. Therefore, any force is not required to mount the elongate member assembly 1 to the mounting object member O, and the decrease of the transmission efficiency of the operating force and the deterioration of the outer casing 22 due to the twisting of the outer casing 22 can be suppressed.

The present embodiment includes the movement limiting portion 32c configured such that the wall-shaped portion W1 is provided on one side of the elongate member 2 and the wall-shaped portion W2 is provided on the other side of the elongate member 2, with the ring-shaped portion 52 being disposed between the wall-shaped portions W1 and W2. The fixing member 5 is provided on the connecting member 3 in a loosely fitted state capable of moving in the axis X direction of the elongate member 2.

In the present embodiment, the distance between the wall-shaped portion W1 on one side and the wall-shaped portion W2 on the other side in the axis X direction is longer than the ring-shaped portion 52 in the axis X direction such that the ring-shaped portion 52 can move within a predetermined range in the axis X direction. As described above, when the fixing member 5 is provided on the connecting member 3 in a loosely fitted state capable of moving in the axis X direction, the ring-shaped portion 52 can move not only around the axis X but also in the axis X direction. Therefore, as illustrated in FIG. 4, the ring-shaped portion 52 can be slid in the direction of the axis X with respect to the rotation permitting portion 32b, even when the position of the mounting portion such as the mounting hole Oa in the axis X direction does not align with the position of the anchor portion 51 in the axis X direction due to dimensional errors or the like of the mounting object member O and other members. Thus, it is possible to cope with a positional deviation between the mounting object member O and the anchor portion 51 in the axis X direction.

Therefore, even when there is the positional deviation of the anchor portion 51 with respect to the mounting object member O in both direction of the axis X and around the axis X, the elongate member assembly 1 can be easily fixed to the mounting object member O when the fixing member 5 is provided on the connecting member 3 in a loosely fitted state capable of moving in the axis X direction.

REFERENCE SIGNS LIST

1 Elongate member assembly
2 Elongate member
2*a* One end
2*b* Other end
21 Inner cable
22 Outer casing
22*a*, 22*b* Terminal connecting member
3 Connecting member
31 Swaging portion
32 Connecting portion
32*a* Hole
32*b* Rotation permitting portion
32*c* Movement limiting portion
4 Swaging member
5 Fixing member
51 Anchor portion
51*a* Extending portion
51*b* Locking portion
51*c* Contact portion
52 Ring-shaped portion
52*a* Band portion
53 Base
53*a* Band accommodating portion
A Annular portion
M Operating force transmitting mechanism
O Mounting object member
Oa Attaching hole
P1 Operation member
P2 Object to be operated
S Support body
W, W1, W2 Wall-shaped portion
X Axis of elongate member

The invention claimed is:

1. An elongate member assembly comprising: an elongate member having one end and another end; a connecting member provided between the one end and the another end of the elongate member; a swaging member that swages and fixes the connecting member to the elongate member; and a fixing member connected to the connecting member, wherein the connecting member includes a swaging portion pressed by the swaging member to the elongate member, and a connecting portion connected to the fixing member, the fixing member includes an anchor portion mounted to a mounting object member, a ring-shaped portion connected to the connecting portion of the connecting member, and a base portion between the anchor portion and the ring-shaped portion, wherein the ring-shaped portion penetrates through the base portion, and the connecting portion includes a hole through which the elongate member penetrates, a rotation permitting portion that permits the ring-shaped portion to move around an axis of the elongate member, and a movement limiting portion that limits movement of the ring-shaped portion in an axial direction of the elongate member.

2. The elongate member assembly according to claim 1, wherein the rotation permitting portion includes an annular portion having a surface around the axis of the elongate member, and the movement limiting portion has a portion extending radially outward from the annular portion.

3. The elongate member assembly according to claim 1, wherein the movement limiting portion is provided in a manner that a portion on one side of the elongate member and another portion on another side of the elongate member are provided such that the ring-shaped portion can be disposed between the portion on the one side and the another portion on the other side, and the fixing member is provided on the connecting member in a fitted state in which the fixing member is movable in the axial direction of the elongate member.

* * * * *